US012734682B2

(12) United States Patent
Imanishi

(10) Patent No.: US 12,734,682 B2
(45) Date of Patent: Sep. 15, 2026

(54) NUMERICAL CONTROL SYSTEM

(71) Applicant: FANUC CORPORATION, Minamitsuru-gun (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 18/294,020

(22) PCT Filed: Aug. 24, 2021

(86) PCT No.: PCT/JP2021/031038
§ 371 (c)(1),
(2) Date: Jan. 31, 2024

(87) PCT Pub. No.: WO2023/026373
PCT Pub. Date: Mar. 2, 2023

(65) Prior Publication Data
US 2024/0342900 A1 Oct. 17, 2024

(51) Int. Cl.
*B25J 9/16* (2006.01)

(52) U.S. Cl.
CPC .................................... *B25J 9/161* (2013.01)

(58) Field of Classification Search
CPC .................... B25J 9/161; B25J 9/1658; G05B 2219/36242; G05B 19/41825; G05B 19/18
See application file for complete search history.

(56) References Cited

U.S. PATENT DOCUMENTS 5,596,683 A * 1/1997 Kasagami .............. B25J 9/1682 901/3
12,429,854 B2 * 9/2025 Imanishi .......... G05B 19/41825
(Continued)

FOREIGN PATENT DOCUMENTS

CN 110597162 A 12/2019
JP H06-028019 A 2/1994
(Continued)

OTHER PUBLICATIONS

International Search Report issued in PCT/JP2021/031038; mailed Nov. 16, 2021.

*Primary Examiner* — Jason Holloway
*Assistant Examiner* — Madison B Emmett
(74) *Attorney, Agent, or Firm* — Studebaker Brackett PLLC

(57) ABSTRACT

Provided is a technology that enables reduction in communication load in a numeral control system for controlling operation of a machine tool and a robot in a cooperative manner. This numeral control system comprises: a numerical control device; a robot control device; and a variable storage unit. The robot control device has a reading-writing execution/prohibition determination unit that determines whether to prohibit or allow execution of reading and writing of a variable by the robot control device. If execution determination has been made by the reading- writing execution/prohibition determination unit, the robot control device reads the value of the variable stored in the variable storage unit, and controls the operation of the robot on the basis of the value of the read variable. If prohibition determination has been made, the robot control device prohibits reading of the value of the variable stored in the variable storage unit.

6 Claims, 8 Drawing Sheets

(56) References Cited

U.S. PATENT DOCUMENTS

| | | | | |
|---|---|---|---|---|
| 2019/0317474 | A1* | 10/2019 | Miyazaki | G05B 19/4063 |
| 2021/0286340 | A1* | 9/2021 | Nagata | G05B 19/4155 |
| 2022/0011754 | A1* | 1/2022 | Sagasaki | G05B 19/41835 |
| 2025/0256398 | A1* | 8/2025 | Imanishi | B25J 9/1658 |

FOREIGN PATENT DOCUMENTS

| | | | |
|---|---|---|---|
| JP | 2018-195055 | A | 12/2018 |
| JP | 2019-053459 | A | 4/2019 |
| JP | 2019-067045 | A | 4/2019 |

* cited by examiner 1
30
30a
30b
3
20
2

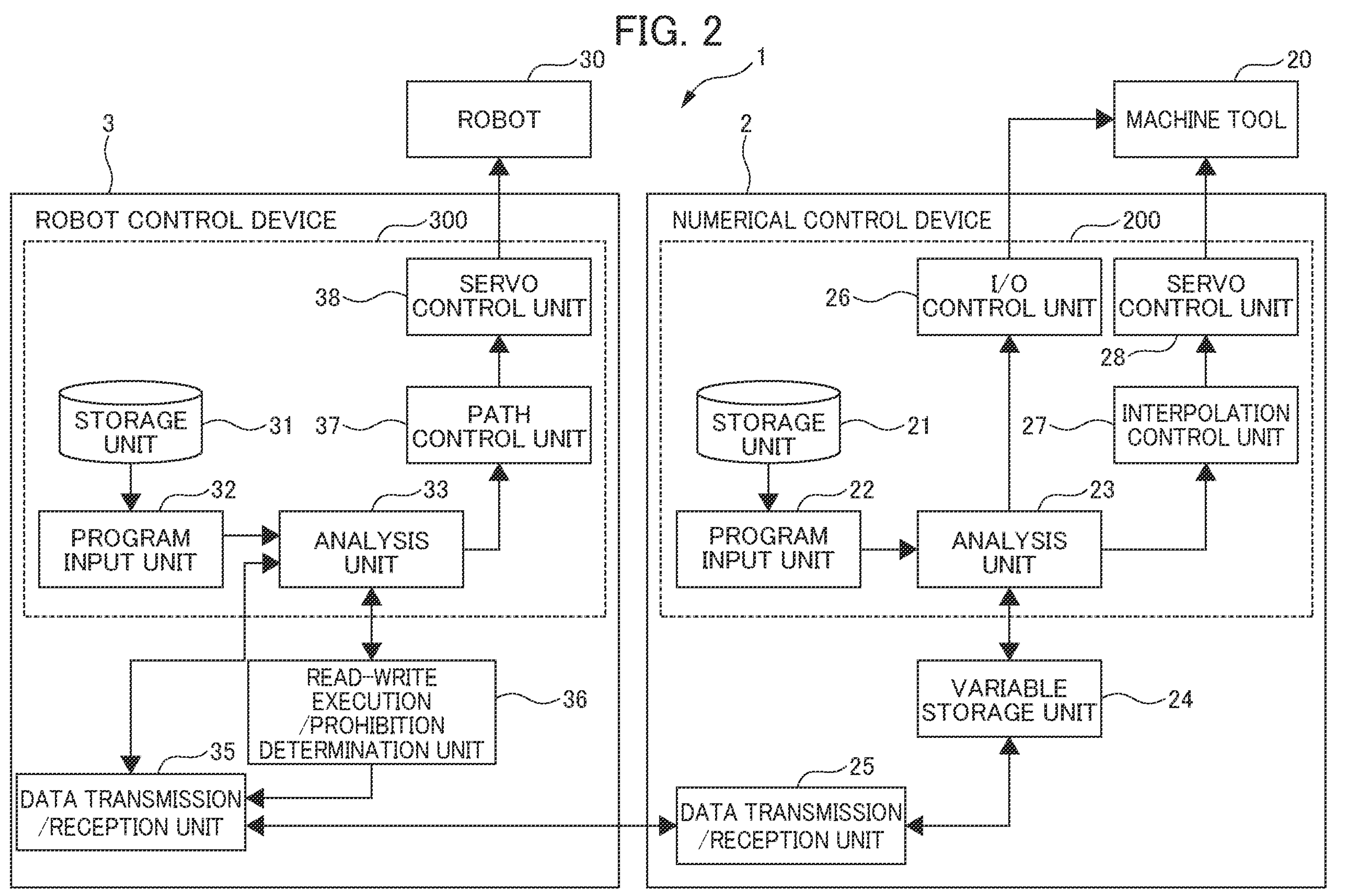
FIG. 2
1
30
ROBOT
20
MACHINE TOOL
3
ROBOT CONTROL DEVICE
300
SERVO CONTROL UNIT
38
STORAGE UNIT
31
PATH CONTROL UNIT
37
PROGRAM INPUT UNIT
32
ANALYSIS UNIT
33
READ-WRITE EXECUTION /PROHIBITION DETERMINATION UNIT
36
DATA TRANSMISSION /RECEPTION UNIT
35
2
NUMERICAL CONTROL DEVICE
200
I/O CONTROL UNIT
26
SERVO CONTROL UNIT
28
STORAGE UNIT
21
INTERPOLATION CONTROL UNIT
27
PROGRAM INPUT UNIT
22
ANALYSIS UNIT
23
VARIABLE STORAGE UNIT
24
DATA TRANSMISSION /RECEPTION UNIT
25

FIG. 3

```
O0123
N10 (MONITOR REQUEST FROM ROBOT)

IF[#101 EQ 1] THEN;
M98 P0001; (OPEN DOOR)
ENDIF;

IF[#102 EQ 1] THEN;
M98 P0002; (CLOSE DOOR)
ENDIF;

IF[#103 EQ 1] THEN;
M98 P0003; (OPEN CHUCK)
ENDIF;

...
IF[#105 EQ 1] THEN
M98 P0005; (START MACHINING 1)
ENDIF;

(RETURN TO TOP DURING PROGRAM
STOP REQUEST BEING TURNED OFF)
IF[#100 EQ 0] GOTO 10;

M30;
```

```
(CALL SUBPROGRAM)
O0005
#205 = 600;(sec)
G00 X100. Y100. Z100;
G01 G91 X100. F1000;
...
#205 = 0;
#105 = 0;(TURN OFF REQUEST)
M99;
```

EXAMPLE OF ASSIGNMENT OF
CUSTOM MACRO VARIABLE :

WRITE VARIABLE FROM ROBOT
#100 : PROGRAM STOP REQUEST
0:TURN OFF REQUEST/1:TURN ON REQUEST
#101 : REQUEST OPENING DOOR
0:TURN OFF REQUEST/1:TURN ON REQUEST
#102 : REQUEST CLOSING DOOR
0:TURN OFF REQUEST/1:TURN ON REQUEST
#103 : REQUEST OPENING CHUCK
0:TURN OFF REQUEST/1:TURN ON REQUEST
#104 : REQUEST CLOSING CHUCK
0:TURN OFF REQUEST/1:TURN ON REQUEST
#105 : REQUEST MACHINING 1
0:TURN OFF REQUEST/1:TURN ON REQUEST
#106 : REQUEST MACHINING 2
0:TURN OFF REQUEST/1:TURN ON REQUEST
#107 : REQUEST MACHINING 3
0:TURN OFF REQUEST/1:TURN ON REQUEST
...
OPERATION COMPLETION TIME :
#200 : PROGRAM STOP OPERATION COMPLETION TIME
#201 : DOOR OPENING COMPLETION TIME
#202 : DOOR CLOSING COMPLETION TIME
#203 : CHUCK OPENING COMPLETION TIME
#204 : CHUCK CLOSING COMPLETION TIME
#205 : MACHINING 1 COMPLETION TIME
#206 : MACHINING 2 COMPLETION TIME
#207 : MACHINING 3 COMPLETION TIME

FIG. 4B

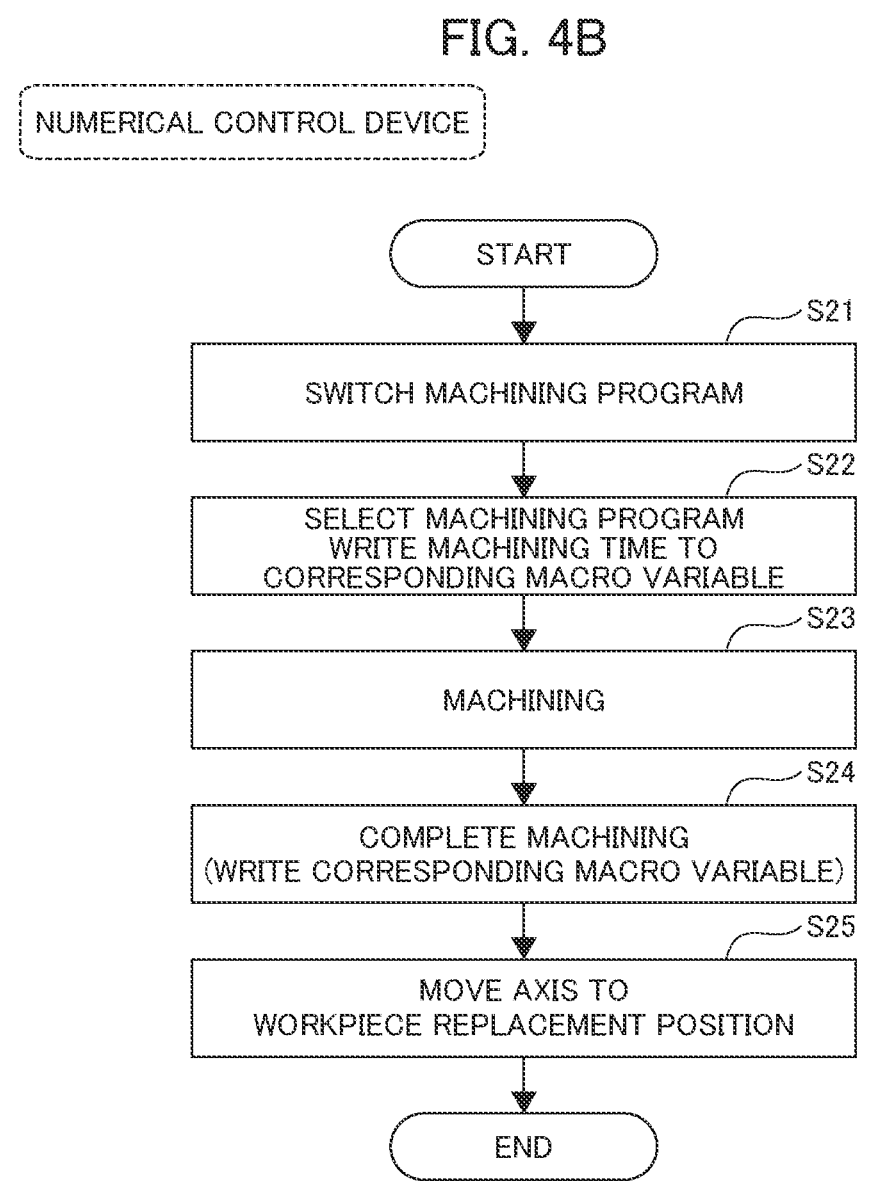

NUMERICAL CONTROL DEVICE

START

S21 SWITCH MACHINING PROGRAM

S22 SELECT MACHINING PROGRAM
WRITE MACHINING TIME TO
CORRESPONDING MACRO VARIABLE

S23 MACHINING

S24 COMPLETE MACHINING
(WRITE CORRESPONDING MACRO VARIABLE)

S25 MOVE AXIS TO
WORKPIECE REPLACEMENT POSITION

END

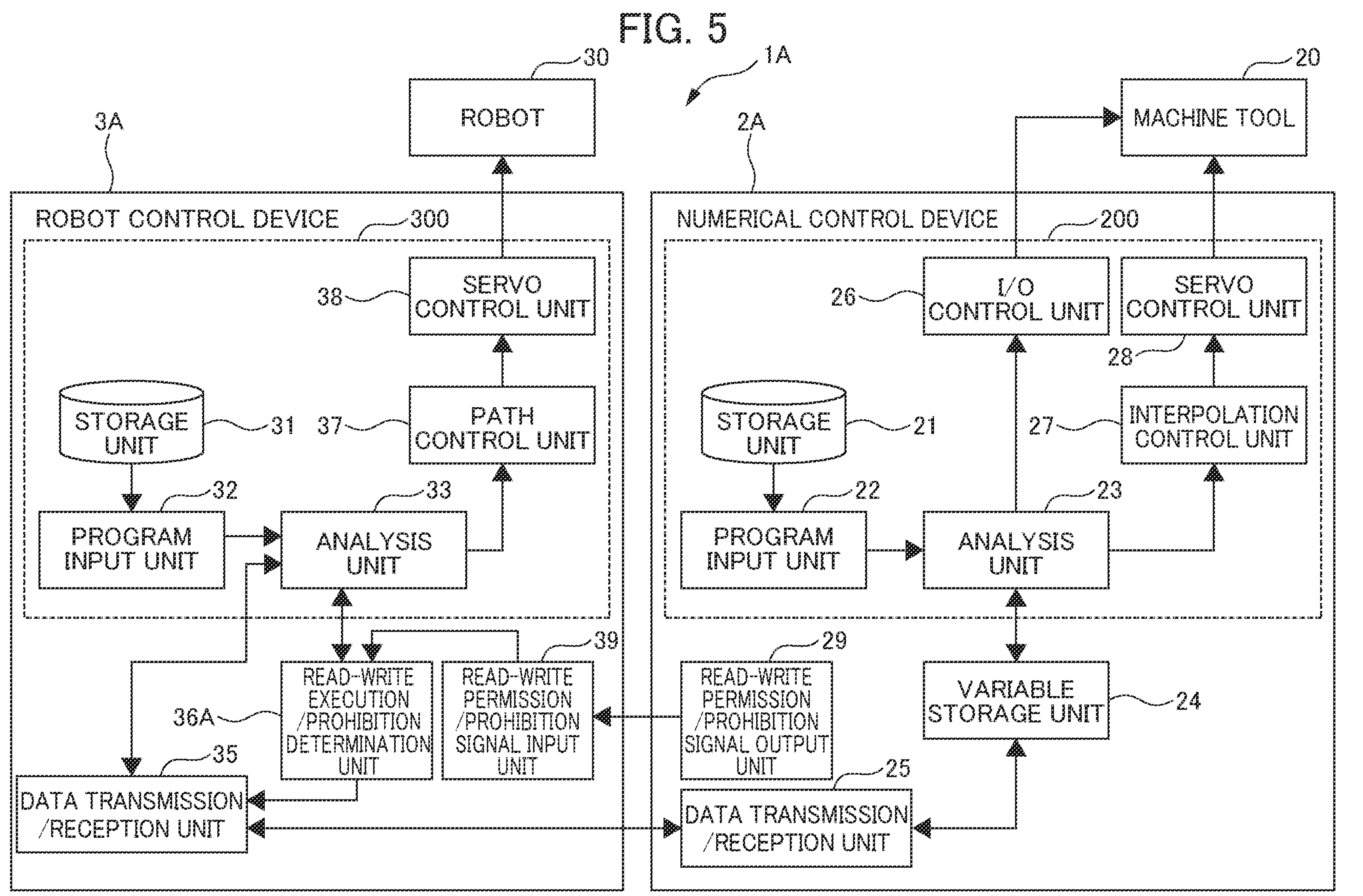
FIG. 5
1A
30
ROBOT
20
MACHINE TOOL
3A
ROBOT CONTROL DEVICE
300
38
SERVO CONTROL UNIT
STORAGE UNIT
31
37
PATH CONTROL UNIT
32
PROGRAM INPUT UNIT
33
ANALYSIS UNIT
36A
READ-WRITE EXECUTION /PROHIBITION DETERMINATION UNIT
39
READ-WRITE PERMISSION /PROHIBITION SIGNAL INPUT UNIT
35
DATA TRANSMISSION /RECEPTION UNIT
2A
NUMERICAL CONTROL DEVICE
200
26
I/O CONTROL UNIT
SERVO CONTROL UNIT
28
STORAGE UNIT
21
27
INTERPOLATION CONTROL UNIT
22
PROGRAM INPUT UNIT
23
ANALYSIS UNIT
29
READ-WRITE PERMISSION /PROHIBITION SIGNAL OUTPUT UNIT
VARIABLE STORAGE UNIT
24
25
DATA TRANSMISSION /RECEPTION UNIT

NUMERICAL CONTROL SYSTEM

TECHNICAL FIELD

The present disclosure relates to a numerical control system.

BACKGROUND ART

In recent years, in order to promote automation of a machining site, there has been a demand for a numerical control system that controls the operation of a machine tool for machining a workpiece in conjunction with the operation of a robot such as the operation of attaching and detaching a workpiece to and from the machine tool and the operation of opening and closing a door (for example, see Patent Document 1).

Generally, the operation of the machine tool is controlled by a numerical control device and the operation of the robot is controlled by a robot control device. In order to control the operation of the machine tool and the operation of the robot in conjunction with each other or in a cooperative manner, it is necessary to operate both the numerical control device and the robot control device. In this regard, in the numerical control system shown in Patent Document 1, for example, the operation program of the robot can be selected and set in accordance with an command from a user from the numerical control device.

CITATION LIST

Patent Document

Patent Document 1: Japanese Unexamined Patent Application, Publication No. 2018-195055

DISCLOSURE OF THE INVENTION

Problems to be Solved by the Invention

However, for example, when the operation of an existing machine tool and the operation of a robot installed later to the machine tool are controlled in conjunction with each other, it is necessary to connect a numerical control device for controlling the operation of the machine tool and a robot control device for controlling the operation of the robot. Further, it is necessary to read and write variables of the numerical control device from the robot control device connected to the numerical control device.

Specifically, the robot control device turns ON an operation request to the numerical control device via a macro variable, and periodically reads the macro variable of the numerical control device from the robot control device to monitor the state. As a result of the monitoring, when the operation is completed, the operation request is turned OFF, and the sequence advances to the next sequence.

However, if communication from the robot control device is interrupted during machining of a workpiece, that is, during operation of the numerical control device, the communication load increases. In this case, there is a problem in that the cycle time increases and the machining accuracy decreases. Accordingly, there is a demand for a technology capable of reducing a communication load in a numerical control system that controls operations of a machine tool and a robot in conjunction with each other.

It is an object of the present disclosure to provide a technology capable of reducing a communication load in a numerical control system that controls operations of a machine tool and a robot in conjunction with each other.

Means for Solving the Problems

An aspect of the present disclosure provides a numerical control system that controls operation of a machine tool and operation of a robot in conjunction with each other, the numerical control system including: a numerical control device that controls the operation of the machine tool based on a numerical control program; a robot control device that controls the operation of the robot based on a robot control program; and a variable storage unit that stores values of variables that are readable and writable by the numerical control device and the robot control device, in which the robot control device includes a read-write execution/prohibition determination unit that determines execution or prohibition of read-write of the variables according to a read-write permission/prohibition request for requesting permission or prohibition of the read-write of the variables by the numerical control device, and when the read-write execution/prohibition determination unit determines that read-write of the variables is executed, the robot control device reads a value of a variable stored in the variable storage unit to control the operation of the robot based on the value of the variable read, and when the read-write execution/prohibition determination unit determines that read-write of the variables is prohibited, the robot control device prohibits reading of a value of a variable stored in the variable storage unit.

Effects of the Invention

According to the present disclosure, it is possible to reduce a communication load in a numerical control system that controls operations of a machine tool and a robot in conjunction with each other.

BRIEF DESCRIPTION OF THE DRAWINGS

FIG. 2 is a functional block diagram of the numerical control system according to the first embodiment;

FIG. 3 is a diagram showing an example of a numerical control program according to the first embodiment;

FIG. 4B is a flowchart showing the flow of processing relating to a numerical control device according to the first embodiment;

FIG. 5 is a functional block diagram of a numerical control system according to a second embodiment;

PREFERRED MODE FOR CARRYING OUT THE INVENTION

Hereinafter, embodiments of the present disclosure will be described in detail with reference to the accompanying drawings.

FIRST EMBODIMENT

Figure 1:
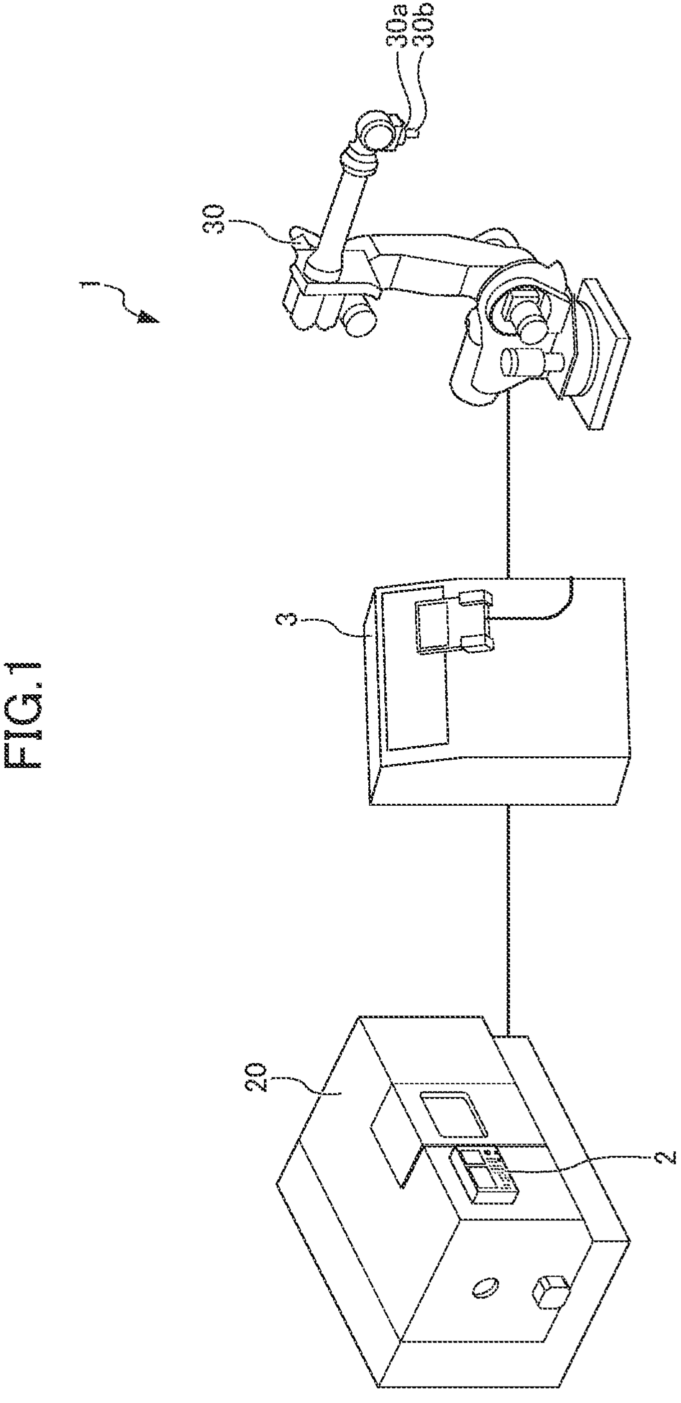
FIG. 1 is a schematic diagram of a numerical control system according to a first embodiment.

FIG. 1 is a schematic diagram of a numerical control system 1 according to a first embodiment. As shown in FIG. 1, the numerical control system 1 includes a machine tool 20 for machining a workpiece (not shown), a numerical control device (CNC) 2 for controlling the operation of the machine tool 20, a robot 30 provided in the vicinity of the machine tool 20, and a robot control device 3 for controlling the operation of the robot 30. The numerical control system 1 controls the operation of the machine tool 20 and the robot 30 in conjunction with each other by using the numerical control device 2 and the robot control device 3, which are communicably connected to each other.

Examples of the machine tool 20 include a lathe, a ball mill, a milling machine, a grinding machine, a laser processing machine, an injection molding machine, and the like. However, the present disclosure is not limited thereto. The machine tool 20 executes various operations such as a machining operation on a workpiece (not shown), an opening/closing operation of a chuck holding the workpiece, and an opening/closing operation of a door provided in a machining area of the workpiece, in accordance with various command signals transmitted from the numerical control device 2 in accordance with a procedure described later.

The robot 30 operates under the control of the robot control device 3, and performs a predetermined operation on, for example, a workpiece to be machined by the machine tool 20. The robot 30 is, for example, a multi-joint or articulated robot, and a tool 30*b* for holding, machining, and inspecting a workpiece is attached to an arm tip portion 30*a* of the robot 30. Hereinafter, although a case where the robot 30 is a six-axis multi-joint robot will be described, the present invention is not limited thereto.

The numerical control device 2 and the robot control device 3 are each a computer including hardware such as an arithmetic processing unit such as a CPU (Central Processing Unit), an auxiliary storage unit such as an HDD (Hard Disk Drive) or SSD (Solid State Drive) storing various programs, a main storage unit such as RAM (Random Access Memory) temporarily storing data required for the arithmetic processing unit to execute programs, an operation means such as a keyboard for an operator to perform various operations, and a display means such as a display for displaying various information for the operator. The numerical control device 2 and the robot control device 3 can transmit and receive various signals to and from each other by Ethernet (registered trademark), for example.

The numerical control system 1 according to the present embodiment includes, for example, one in which the robot 30 is attached to an existing machine tool 20. However, the present invention is not limited thereto. For example, in order to control the operation of the machine tool 20 and the operation of the robot 30 in conjunction with each other, the numerical control system 1 according to the present embodiment is configured such that the robot control device 3 makes an operation request to the numerical control device 2, and the robot control device 3 can read and write variables of the numerical control device 2.

FIG. 2 is a functional block diagram of the numerical control system 1 according to the first embodiment.

First, the detailed configuration of the numerical control device 2 will be described. As shown in FIG. 2, various functions such as a machine tool control module 200 that controls the operation of the machine tool 20, a variable storage unit 24 that stores values of a plurality of variables that can be read and written by the machine tool control module 200 and a robot control module 300 to be described later, and a data transmission/reception unit 25 are implemented in the numerical control device 2 by the above hardware configuration.

The machine tool control module 200 reads and writes values of variables stored in the variable storage unit 24 based on a numerical control program, and controls the operation of the machine tool 20. More specifically, the machine tool control module 200 includes a storage unit 21, a program input unit 22, an analysis unit 23, an I/O control unit 26, an interpolation control unit 27, and a servo control unit 28.

The storage unit 21 stores a numerical control program for controlling the operation of the machine tool 20 (for example, a movement operation of a control axis, a rotation operation of a spindle or main axis, an opening/closing operation of a chuck, an opening/closing operation of a door, and the like are performed). The numerical control program stored in the storage unit 21 is created in advance by an operator in order to control the operation of the machine tool 20 in conjunction with the operation of the robot 30 under the control of the robot control device 3, and is described in a programming language using G code, M code, or the like.

The program input unit 22 reads the numerical control program from the storage unit 21, and sequentially inputs the numerical control program to the analysis unit 23.

The analysis unit 23 sequentially analyzes the command type based on the numerical control program inputted from the program input unit 22 for each block, and transmits the analysis result to the I/O control unit 26, the interpolation control unit 27, and the variable storage unit 24.

When the type of command acquired based on the numerical control program is, for example, a command to open and close the chuck of the machine tool 20 or a command to open and close the door of the machine tool 20, the analysis unit 23 inputs the acquired command to the I/O control unit 26. When the command is inputted from the analysis unit 23, the I/O control unit 26 inputs an I/O signal corresponding to the inputted command to the machine tool 20. With such a configuration, the chuck and door of the machine tool 20 are opened and closed in accordance with a procedure determined by the numerical control program.

When the type of command acquired based on the numerical control program is, for example, a command to move the control axis of the machine tool 20, the analysis unit 23 inputs the acquired command to the interpolation control unit 27. When the command is inputted from the analysis unit 23, the interpolation control unit 27 calculates a movement path of the control axis according to the command by performing interpolation processing, and inputs the calculated movement path to the servo control unit 28. The servo control unit 28 feedback-controls the servo motor of the machine tool 20 so that the control axis moves along the movement path calculated by the interpolation control unit 27. With such a configuration, the operation of the machine tool 20 is controlled by a procedure defined by the numerical control program.

When the type of the command acquired based on the numerical control program is, for example, a command to read the value of the variable stored in the variable storage unit 24 or a command to rewrite the value of the variable stored in the variable storage unit 24, the analysis unit 23 inputs the acquired command to the variable storage unit 24.

The variable storage unit 24 has variable memory (not shown) for storing a plurality of variable values, and reads or rewrites the variable values stored in the variable memory in accordance with a command inputted from the analysis unit 23 or a command inputted from the robot control module 300 described later of the robot control unit 3 via the data transmission/reception unit 25.

In the present embodiment, when a value of the variable assigned to the operation request from the robot control device 3 side to the machine tool 20 is set, the operation completion time is written to the corresponding variable by the machine tool control module 200 and the variable storage unit 24, and the corresponding operation (for example, door opening/closing, chuck opening/closing, machining 1 to 3 described later, and the like) is executed.

The variable memory of the variable storage unit 24 stores values of a plurality of variables designated by numbers or character strings in a numerical control program for controlling the operation of the machine tool 20 in the machine tool control module 200 and a robot control program for controlling the operation of the robot 30 in the robot control module 300. In the present embodiment, as variables stored in the variable memory, a case where a part of macro variables (hereinafter, it is also simply referred to as a variable) defined by many numerical control devices (e.g., #100 to #108, #200 to #207) is assigned will be described.

When a command for reading the value of the variable stored in the variable memory is inputted from the analysis unit 23, the variable storage unit 24 reads the value of the variable designated by the command from the variable memory and transmits the read value to the analysis unit 23. When a command for rewriting the value of the variable stored in the variable memory is inputted from the analysis unit 23, the variable storage unit 24 rewrites the value of the variable designated by the command in the variable memory to a value corresponding to the command. With such a configuration, the machine tool control module 200 can read or rewrite the value of the variable stored in the variable memory.

When a command for reading the value of the variable stored in the variable memory is inputted from the robot control module 300 via the data transmission/reception unit 25, the variable storage unit 24 reads the value of the variable designated by the command from the variable memory, and transmits the read value to the robot control module 300 via the data transmission/reception unit 25. When a command for rewriting the value of the variable stored in the variable memory is inputted from the robot control module 300 via the data transmission/reception unit 25, the variable storage unit 24 rewrites the value of the variable designated by the command in the variable memory to a value corresponding to the command. With such a configuration, the robot control module 300 can read or rewrite the value of the variable stored in the variable memory.

The variable memory of the variable storage unit 24 stores values of a plurality of variables assumed to be used for notification or request from the robot control module 300 to the machine tool control module 200; however, the present invention is not limited thereto. Values of a plurality of variables assumed to be used for notification from the machine tool control module 200 to the robot control module 300 may be stored. The variables are preferably readable and rewritable from both the machine tool control module 200 and the robot control module 300.

The variable #100 is assigned, for example, from the robot control module 300 to the machine tool control module 200 to request stopping of the numerical control program being executed in the machine tool control module 200. When the value of the variable #100 is 0, it indicates that the stop of the numerical control program is not requested (request OFF), and when the value of the variable #100 is 1, it indicates that the stop of the numerical control program is requested (request ON).

The variable #101 is assigned, for example, from the robot control module 300 to the machine tool control module 200 to request the opening operation of the door of the machine tool 20. When the value of the variable #101 is 0, it indicates that the door opening operation is not requested (request OFF), and when the value of the variable #101 is 1, it indicates that the door opening operation is requested (request ON).

The variable #102 is assigned, for example, from the robot control module 300 to the machine tool control module 200 to request a closing operation of the door of the machine tool 20. When the value of the variable #102 is 0, it indicates that the door closing operation is not requested (request OFF), and when the value of the variable #102 is 1, it indicates that the door closing operation is requested (request ON).

The variable #103 is assigned, for example, from the robot control module 300 to the machine tool control module 200 to request an opening operation of the chuck of the machine tool 20. When the value of the variable #103 is 0, it indicates that the chuck opening operation is not requested (request OFF), and when the value of the variable #103 is 1, it indicates that the chuck opening operation is requested (request ON).

The variable #104 is assigned, for example, from the robot control module 300 to the machine tool control module 200 to request a chuck closing operation of the machine tool 20. When the value of the variable #104 is 0, it indicates that the chuck closing operation is not requested (request OFF), and when the value of the variable #104 is 1, it indicates that the chuck closing operation is requested (request ON).

The variable #105 is assigned, for example, from the robot control module 300 to the machine tool control module 200 to request execution of machining 1 by the machine tool 20. When the value of the variable #105 is 0, it indicates that the execution of the machining 1 is not requested (request OFF), and when the value of the variable #105 is 1, it indicates that the execution of the machining 1 is requested (request ON).

The variable #106 is assigned, for example, from the robot control module 300 to the machine tool control module 200 to request execution of machining 2 by machine tool 20. When the value of the variable #106 is 0, it indicates that the execution of the machining 2 is not requested (request OFF), and when the value of the variable #106 is 1, it indicates that the execution of the machining 2 is requested (request ON).

The variable #107 is assigned, for example, from the robot control module 300 to the machine tool control module 200 to request execution of machining 3 by the machine tool 20. When the value of the variable #107 is 0, it indicates that the execution of the machining 3 is not requested (request OFF), and when the value of the variable #107 is 1, it indicates that the execution of the machining 3 is requested (request ON).

The variable #108 is assigned, for example, from the robot control module 300 to the machine tool control module 200 to request replacement of the workpiece. When the value of the variable #108 is 0, it indicates that the replacement of the workpiece is not requested (request OFF), and when the value of the variable #108 is 1, it indicates that the replacement of the workpiece is requested.

The variable #200 is assigned, for example, to a program stop operation completion time in a program stop request from the robot control module 300 to the machine tool control module 200. The variable #201 is assigned, for example, to a door opening completion time in the door opening request from the robot control module 300 to the machine tool control module 200. The variable #202 is assigned to a door closing completion time in the door closing request from the robot control module 300 to the machine tool control module 200. The variable #203 is assigned to a chuck opening completion time in the chuck opening request from the robot control module 300 to the machine tool control module 200. The variable #204 is assigned to a chuck closing completion time in the chuck close request from the robot control module 300 to the machine tool control module 200. The variable #205 is assigned to a machining 1 completion time in the machining 1 request from the robot control module 300 to the machine tool control module 200. The variable #206 is assigned to a machining 2 completion time in the machining 2 request from the robot control module 300 to the machine tool control module 200. The variable #207 is assigned to a machining 3 completion time in the machining 3 request from the robot control module 300 to the machine tool control module 200.

The values of the plurality of variables stored in the variable memory are reset to a predetermined initial value (for example, 0) in response to turning on the numerical control device 2.

Next, the configuration of the robot control device 3 will be described in detail. As shown in FIG. 2, in the robot control device 3, various functions such as the robot control module 300 for controlling the operation of the robot 30, a data transmission/reception unit 35, and a read-write execution/prohibition determination unit 36 are implemented by the above hardware configuration.

The robot control module 300 reads and writes the value of the variable stored in the variable storage unit 24 and controls the operation of the robot 30 based on the robot control program. More specifically, the robot control module 300 includes a storage unit 31, a program input unit 32, an analysis unit 33, a path control unit 37, and a servo control unit 38.

The storage unit 31 stores a robot control program for controlling the operation of the robot 30. The robot control program stored in the storage unit 31 is created by an operator in advance in order to control the operation of the robot 30 in conjunction with the operation of the machine tool 20 under the control of the numerical control device 2.

The program input unit 32 reads the robot control program from the storage unit 31, and sequentially inputs the robot control program to the analysis unit 33.

The analysis unit 33 sequentially analyzes the command type based on the robot control program inputted from the program input unit 32 for each block, and transmits the analysis result to the path control unit 37, the data transmission/reception unit 35, and the read-write execution/prohibition determination unit 36.

When the type of command acquired based on the robot control program is, for example, a command to move a control point (for example, the arm tip portion 30*a*) of the robot 30, the analysis unit 33 inputs the acquired command to the path control unit 37. When a command is inputted from the analysis unit 33, the path control unit 37 calculates an operation path of the control point when the control point of the robot 30 is moved to a position designated by the command, calculates an angle of each joint of the robot 30 according to the calculated operation path as a target angle, and transmits these target angles to the servo control unit 38. The servo control unit 38 generates a robot control signal for the robot 30 by feedback-controlling each servo motor of the robot 30 so as to realize the target angle of each of the joints transmitted from the path control unit 37, and inputs the robot control signal to the servo motors of the robot 30. Thus, the operation of the robot 30 is controlled by a procedure determined by the robot control program.

When the type of the command acquired based on the robot control program is, for example, a command to read the value of the variable stored in the variable storage unit 24 or a command to rewrite the value of the variable stored in the variable storage unit 24, the analysis unit 33 inputs the acquired command to the data transmission/reception unit 35.

When receiving a command to read the value of the variable from the analysis unit 33, the data transmission/reception unit 35 transmits the command to the data transmission/reception unit 25 of the numerical control device 2. As described above, when such a read command is inputted, the variable storage unit 24 reads the value of the variable designated by the command from the variable memory, and returns the read value to the analysis unit 33 via the data transmission/reception unit 25 and the data transmission/reception unit 35. When receiving a command to rewrite the value of the variable from the analysis unit 33, the data transmission/reception unit 35 transmits the command to the data transmission/reception unit 25 of the numerical control device 2. As described above, when such a rewrite command is inputted, the variable storage unit 24 rewrites the value of the variable designated by the command in the variable memory to a value corresponding to the command. Thus, the robot control module 300 can read or rewrite the value of the variable stored in the variable memory.

The read-write execution/prohibition determination unit 36 determines execution or prohibition of read-write of variables by the robot control device 3 according to a read-write permission/prohibition request requesting permission or prohibition of read-write of variables by the robot control device 3. Conventionally, for example, when communication from the robot control device 3 is interrupted during machining of a workpiece, i.e., during operation of the numerical control device 2, the communication load increases. In this case, there is a problem in that the cycle time increases and the machining accuracy decreases. In this regard, since the numerical control system 1 according to the present embodiment includes the read-write execution/prohibition determination unit 36, it is possible to prohibit the read-write of variables from the robot control device 3 to the variable storage unit 24 during the operation of the numerical control device 2, for example, thereby reducing the communication load.

More specifically, the read-write execution/prohibition determination unit 36 first acquires the operation completion time of the numerical control device 2 or the operation completion time of the robot control device 3. The acquisition of these operation times is performed via variables in the numerical control program or the robot control program. In the above example, the operation completion time of the numerical control device 2 is acquired via the variables #201 to 207, and the operation completion time of the robot control device 3 is acquired via the variable #200. Then, a read-write permission/prohibition request is determined based on whether or not the acquired operation completion time of the numerical control device 2 or operation completion time of the robot control device 3 has elapsed, and the read-write execution/prohibition determination unit 36 determines execution or prohibition of reading/writing of variables by the robot control device 3 in accordance with the read-write permission/prohibition request.

With such a configuration, the read-write execution/prohibition determination unit 36 determines the execution of the read-write of the variable by the robot control device 3 after the operation completion time of the numerical control device 2 or the operation completion time of the robot control device 3 has elapsed. Further, the read-write execution/prohibition determination unit 36 determines the prohibition of reading/writing of variables by the robot control device 3 before the operation completion time of the numerical control device 2 or the operation completion time of the robot control device 3 has elapsed.

That is, when the read-write execution/prohibition determination unit 36 determines that the robot control device 3 executes the read-write of the variable, the robot control device 3 reads the value of the variable stored in the variable storage unit 24, and controls the operation of the robot 30 based on the read value of the variable. Further, when the read-write execution/prohibition determination unit 36 determines that the robot control device 3 is prohibited from reading and writing variables, the robot control device 3 prohibits reading of the value of variable stored in the variable storage unit 24.

FIG. 3 is a diagram showing an example of a numerical control program according to the first embodiment. FIG. 3 shows, as an example, a numerical control program having a program number 0123, and a sequence number N10 is assigned to the first block. FIG. 3 also shows an example of the assignment of the above-described custom macro variables.

In the numerical control program shown in FIG. 3, the machine tool control module 200 reads the values of the variables #100 to #108 at a predetermined period, thereby monitoring the request from the robot control module 300 and controlling the operation of the machine tool 20 by the machine tool control module 200 in accordance with the read values of the variables #100 to #108. Further, according to an operation request from the robot control module 300, the machine tool control module 200 rewrites the value of each operation completion time of the variables #200 to #207 corresponding to each operation request.

The robot control module 300 controls the operation of the robot 30 according to the robot control program, and rewrites the values of the variables #100 to #108 stored in the variable memory of the variable storage unit 24 in accordance with the robot control program. Further, the robot control module 300 reads the values of the operation completion times of the variables #200 to #207 rewritten in the machine tool control module 200, and the read-write execution/prohibition determination unit 36 performs the execution/prohibition determination of the read-write of the variables by the robot control device 3.

More specifically, in the first block, the machine tool control module 200 reads the value of the variable #101 stored in the variable memory, and determines whether or not the read value is "1". When the value of the variable #101 is "1", that is, when the opening operation of the door of the machine tool 20 is requested from the robot control module 300, the machine tool control module 200 calls the subprogram of the program number "0001" according to the command "M98" for calling the subprogram, and when the value of the variable #101 is "0", the machine tool control module 200 moves to the next block. In addition, the machine tool control module 200 executes the subprogram of the program number "0001" to open the door of the machine tool 20 and reset the value of the variable #101 to "0", and then returns to the main program shown in FIG. 3.

In the next block, the machine tool control module 200 reads the value of the variable #102 stored in the variable memory, and determines whether or not the read value is "1". When the value of the variable #102 is "1", that is, when the closing operation of the door of the machine tool 20 is requested from the robot control module 300, the machine tool control module 200 executes the subprogram of the program number "0002", and when the value of the variable #102 is "0", the machine tool control module 200 moves to the next block. The machine tool control module 200 closes the door of the machine tool 20 by executing the subprogram of the program number "0002", resets the value of the variable #102 to "0", and then returns to the main program shown in FIG. 3.

In the next block, the machine tool control module 200 reads the value of the variable #103 stored in the variable memory, and determines whether or not the read value is "1". When the value of the variable #103 is "1", that is, when the chuck opening operation of the machine tool 20 is requested from the robot control module 300, the machine tool control module 200 executes the subprogram of the program number "0003", and when the value of the variable #103 is "0", the machine tool control module 200 moves to the next block. The machine tool control module 200 executes the subprogram of the program number "0003" to open the chuck of the machine tool 20 and reset the value of the variable #103 to "0", and then returns to the main program shown in FIG. 3.

Although not shown, the machine tool control module 200 similarly reads the value of the variable #104 stored in the variable memory, and determines whether or not the read value is "1". When the value of the variable #104 is "1", that is, when the closing operation of the chuck of the machine tool 20 is requested from the robot control module 300, the machine tool control module 200 executes the subprogram of the program number "0004", and when the value of the variable #104 is "0", the machine tool control module 200 moves to the next block. In addition, the machine tool control module 200 executes the subprogram of the program number "0004" to close the chuck of the machine tool 20 and reset the value of the variable #104 to "0", and then returns to the main program shown in FIG. 3.

In the next block, the machine tool control module 200 reads the value of the variable #105 stored in the variable memory, and determines whether or not the read value is "1". The machine tool control module 200 executes the subprogram of the program number "0005" when the value of the variable #105 is "1", that is, when the robot control module 300 requests the machine tool 20 to perform the operation of the machine tool 1, and shifts to the next block when the value of the variable #105 is "0".

FIG. 3 shows an example of a subprogram having a program number "0005". When the subprogram of the program number "0005" is called, the machine tool control module 200 rewrites the value of the completion time of the machining 1 of the variable #205 corresponding to the operation request of the machining 1 to, for example, 600 seconds in response to the operation request of the machining 1 from the robot control module 300. At this time, the robot control module 300 acquires the operation completion time of the machining 1 by reading the value of the rewritten variable #205, and the read-write execution/prohibition determination unit 36 determines the execution or prohibition of the read-write of the variable by the robot control device 3 in accordance with the read-write permission/prohibition request based on the lapse of the acquired operation completion time of the machining 1.

Various commands "G00" and "G01" for machining the workpiece by the machine tool 20 are inputted to the machine tool control module 200, and the machine tool control module 200 controls the positioning operation, the linear interpolation operation, and the like of the machine tool 20 in accordance with the procedure determined by the numerical control program to machine the workpiece. When the operation of the machining 1 is completed, the machine tool control module 200 rewrites the value of completion time of the machining 1 of the variable #205 corresponding to the operation request of the machining 1 to 0 seconds, rewrites the value of the variable #105 stored in the variable memory to "0", and returns to the main program shown in FIG. 3 in accordance with the command "M99".

Although not shown, the operation requests of the machining 2 and the machining 3 by the machine tool 20 from the robot control module 300 are also executed by the numerical control program, similarly to the operation request of the machining 1 described above. As for rewriting of the completion time of the machining 1 of the variable #205 in the subprogram of the program number "0005", the operation completion time is similarly rewritten in the subprograms of the program numbers "0000" to "0007", although not shown. Further, each of the rewritten operation completion times is used by the read-write execution/prohibition determination unit 36 to determine whether or not the robot control device 3 executes or prohibits reading/writing of variables.

In the next block, the machine tool control module 200 reads the value of the variable #100 stored in the variable memory, and determines whether or not the read value is "0". When the value of the variable #100 is "0", that is, when stop of the numerical control program is not requested from the robot control module 300, the machine tool control module 200 returns to the sequence number "N10" and monitors the values of the variables #100 to #107 again. When the value of the variable #100 is "1", i.e., when the robot control module 300 requests stop of the numerical control program, the machine tool control module 200 ends the numerical control program shown in FIG. 3 in accordance with the command "M30".

Next, the flow of processing of the numerical control system 1 according to the first embodiment will be described in detail with reference to FIGS. 4A and 4B.

Figure 4A:
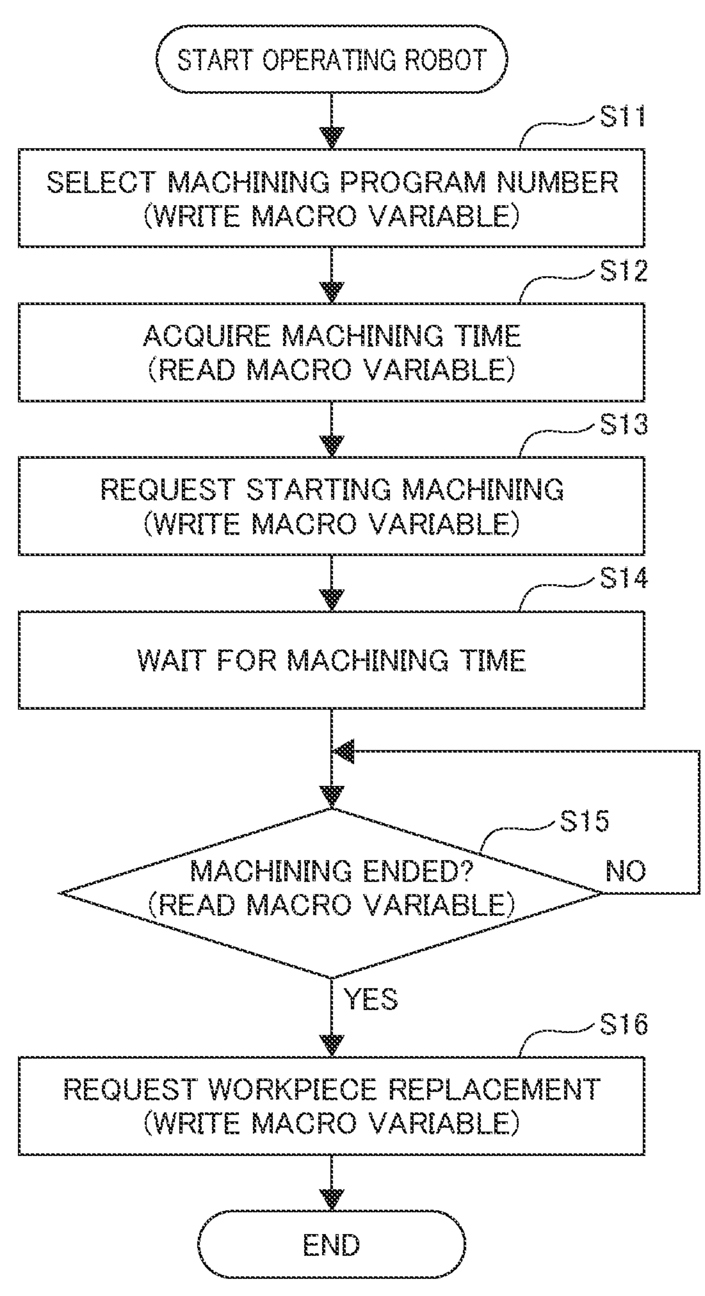
FIG. 4A is a flowchart showing a flow of processing relating to a robot control device according to the first embodiment.

FIG. 4A is a flowchart showing a flow of processing relating to the robot control device 3 according to the first embodiment. FIG. 4B is a flowchart showing a flow of processing relating to the numerical control device 2 according to the first embodiment. These pieces of processing are repeatedly executed in accordance with the start of the operation of the robot 30, and are executed in parallel in conjunction with each other.

First, as shown in Step S11 of FIG. 4A, the robot control device 3 selects a machining program number. Specifically, the robot control module 300 writes a machining program number to be called as a subprogram in a corresponding macro variable, for example, the variable #105. The machining program number written in the variable #105 is stored in the variable storage unit 24.

At this time, as shown in Step S21 of FIG. 4B, the numerical control device 2 switches the machining program. Specifically, the machine tool control module 200 reads the machining program number written in Step S11 and stored in the variable storage unit 24, and switches the machining program number to the read machining program number.

Next, as shown in Step S22 of FIG. 4B, the numerical control device 2 selects a machining program. Specifically, in the machine tool control module 200, the machining program corresponding to the machining program number switched in Step S21 is selected from the storage unit 21. Further, the machining time, i.e., the operation completion time, is written in a macro variable corresponding to the machining operation in the selected machining program, for example, the variable #205. The machining time (operation completion time) written in the variable #205 is stored in the variable storage unit 24.

At this time, as shown in Step S12 of FIG. 4A, the robot control device 3 acquires the machining time (operation completion time). Specifically, the robot control module 300 reads and acquires the machining time (operation completion time) written in Step S22 and stored in the variable storage unit 24.

Next, as shown in Step S13 of FIG. 4A, the robot control device 3 requests the numerical control device 2 to start machining. Specifically, the robot control module 300 rewrites the value of the macro variable assigned to the machining start request, for example, the value of the variable #105, to "1". The variable #105 rewritten to "1" is stored in the variable storage unit 24.

Thus, as shown in Step S23 of FIG. 4B, the numerical control device 2 starts machining according to the selected machining program. Specifically, in the machine tool control module 200, machining is started by reading the value of the variable #105 of the machining start request which is rewritten to "1" in Step S13 and stored in the variable storage unit 24.

Next, as shown in Step S14 of FIG. 4A, the robot control device 3 waits until the machining time (operation completion time) has elapsed. That is, the read-write execution/prohibition determination unit 36 prohibits reading/writing of variables from the robot control module 300 until the machining time (operation completion time) has elapsed. This reduces the communication load until the machining time (operation completion time) has elapsed.

Next, the robot control device 3 waits until the machining time (operation completion time) has elapsed, and then determines whether or not the machining has ended as shown in Step S15 of FIG. 4A. Specifically, the robot control module 300 reads a macro variable of the machining start request stored in the variable storage unit 24, for example, a value of the variable #105, and determines whether or not the read value is "0". If this determination is YES, the processing advances to Step S16, and if NO, the determination of Step S15 is repeated.

At this time, as shown in Step S24 of FIG. 4B, when the machining is completed in the numerical control device 2, the value of the macro variable assigned to the machining start request, for example, the value of the variable #105 is rewritten to "0". The variable #105 rewritten to "0" is stored in the variable storage unit 24. With such a configuration, it is determined that the determination in Step S15 of FIG. 4A is YES.

Next, as shown in Step S16 of FIG. 4A, the robot control device 3 requests replacement of the workpiece. Specifically, the robot control module 300 rewrites the value of the macro variable assigned to the workpiece replacement request, for example, the value of the variable #108 to "1". The variable #108 rewritten to "1" is stored in the variable storage unit 24. Thus, the processing of the robot control device 3 is terminated.

At this time, as shown in Step S25 of FIG. 4B, the numerical control device 2 requests the numerical control device 2 to move the axis to the workpiece replacement position. Specifically, in the machine tool control module 200, by reading the value of the variable #108 of the workpiece replacement request which has been rewritten to "1" in Step S16 and stored in the variable storage unit 24, the axis of the machine tool 20 is moved to the workpiece replacement position to replacement the workpiece. Thus, the processing of the numerical control device 2 is terminated.

According to the present embodiment, the following advantageous effects are achieved.

The numerical control system 1 includes the numerical control device 2 that controls the operation of the machine tool 20 based on the numerical control program, the robot control device 3 that controls the operation of the robot 30 based on the robot control program, and the variable storage unit 24 that stores the values of variables that are readable and writable by the numerical control device 2 and the robot control device 3. The robot control device 3 includes the read-write execution/prohibition determination unit 36 that determines execution or prohibition of read-write of the variables according to a read-write permission/prohibition request for requesting permission or prohibition of the read-write of the variables by the numerical control device 2. Further, when the read-write execution/prohibition determination unit 36 determines that read-write of the variables is executed, the robot control device 3 reads a value of a variable stored in the variable storage unit 24 to control the operation of the robot 30 based on the value of the variable read, and when the read-write execution/prohibition determination unit 36 determines that read-write of the variables is prohibited, the robot control device 3 prohibits reading a value of a variable stored in the variable storage unit 24.

Conventionally, since it is necessary to turn on an operation request from a robot control device to a numerical control device via a macro variable, to periodically read the macro variable of the numerical control device from the robot control device to monitor a state, and to turn off the operation request when the operation has been completed, the communication load is large. On the contrary, according to the present embodiment, since the read-write execution/prohibition determination unit 36 is provided, it is possible to determine execution or prohibition of read-write of the variables by the robot control device 3 according to the read-write permission/prohibition request for requesting the permission or prohibition of the read-write of the variable by the robot control device 3, whereby it is possible to reduce the communication load. In particular, since it is possible to prohibit reading and writing the variables by the robot control device 3 during machining of the workpiece, i.e., during the operation of the numerical control device 2, it is possible to avoid a situation in which communication from the robot control device 3 interrupts so that the communication load increases, resulting in an increase in cycle time and a decrease in machining accuracy.

Further, in the numerical control system 1, the read-write execution/prohibition determination unit 36 acquires an operation completion time of the numerical control device 2 or an operation completion time of the robot control device 3, and according to the read-write permission/prohibition request based on a lapse of these operation completion times, determines execution or prohibition of read-write of the variables by the robot control device 3. Further, the read-write execution/prohibition determination unit 36 determines that the robot control device 3 executes read-write of the variables after a lapse of the operation completion time of the numerical control device 2 or the operation completion time of the robot control device 3. With such a configuration, since it is possible to reliably prohibit read-write of the variables by the robot control device 3 until the operation completion time of the numerical control device 2 or the operation completion time of the robot control device 3 elapses, it is possible to reduce the communication load more reliably.

In the numerical control system 1, the read-write execution/prohibition determination unit 36 acquires the operation completion time of the numerical control device 2 or the operation completion time of the robot control device 3 via a variable in the numerical control program or the robot control program. With such a configuration, by reading the operation completion time of the numerical control device 2 or the operation completion time of the robot control device 3 written in the variables in the numerical control program or the robot control program, it is possible to achieve the above-described advantageous effect.

In the numerical control system 1, the numerical control device 2 performs read-write of the values of the variables stored in the variable storage unit 24 based on the numerical control program, and the robot control device 3 performs rear-write of the values of the variables stored in the variable storage unit 24 based on the robot control program. That is, variables defined in the numerical control program and the robot control program are used as variables for use in transmitting notifications and requests between the numerical control device 2 and the robot control device 3. With such a configuration, it is possible to control the operation of the machine tool 20 and the operation of the robot 30 in conjunction with each other without updating the software of the existing numerical control device 2 or the robot control device 3.

In the numerical control system 1, the variables are designated by numbers or character strings in the numerical control program and the robot control program. Such a configuration makes it possible to achieve an advantageous effect in which it is possible to easily recognize the variables in which the operation completion time is written.

Further, according to the numerical control system 1, since the notification from the machine tool control module 200 to the robot control module 300, the notification, the request, etc., from the robot control module 300 to the machine tool control module 200, can be performed via variables which can be read and written from both of them, it is possible to easily operate the machine tool 20 and the robot 30 in conjunction with each other without newly adding an I/O signal or an external device or editing an existing ladder circuit. Further, according to the numerical control system 1, it is possible to respond to various automated forms simply by storing values of various variables in the variable storage unit 24.

Second Embodiment

FIG. 5 is a functional block diagram of a numerical control system 1A according to a second embodiment. The numerical control system 1A according to the second embodiment differs from the numerical control system 1 according to the first embodiment in that the numerical control system 1A further includes a read-write permission/prohibition signal output unit 29 and a read-write permission/prohibition signal input unit 39, and in that the configuration of the read-write execution/prohibition determination unit 36A is different from that of the read-write execution/prohibition determination unit 36, and the other configurations are the same as those of the first embodiment. Hereinafter, the differences from the first embodiment will be described in detail, and the description of the configuration common to the first embodiment will be omitted.

As shown in FIG. 5, the numerical control device 2A includes the read-write permission/prohibition signal output unit 29. The read-write permission/prohibition signal output unit 29 outputs a read-write prohibition signal, which is an I/O signal that prohibits read-write of variables by the robot control device 3A, during the operation of the numerical control device 2A or during the operation of the robot control device 3A. Further, the read-write permission/prohibition signal output unit 29 outputs a read-write permission signal, which is an I/O signal that permits the robot control device 3 to read and write variables after the operation of the numerical control device 2A is completed or after the operation of the robot control device 3A is completed.

The read-write permission/prohibition signal of the I/O signal outputted from the read-write permission/prohibition signal output unit 29 is based on, for example, an I/O signal inputted from the outside of the numerical control program such as an operation panel of the machine tool 20 or a ladder program.

The robot control device 3A includes the read-write permission/prohibition signal input unit 39. The read-write permission/prohibition signal outputted from the read-write permission/prohibition signal output unit 29 is inputted to the read-write permission/prohibition signal input unit 39.

According to the read-write permission/prohibition request based on the abovementioned read-write permission/prohibition signal, the read-write execution/prohibition determination unit 36A determines execution or prohibition of reading/writing of variables by the robot control device 3A. That is, the first embodiment determines the execution or prohibition of read-write of variables by the robot control device 3A according to the read-write permission/prohibition request based on the operation completion time of the numerical control device 2A or the lapse of the operation completion time of the robot control device 3A acquired via variables in the numerical control program and the robot control program. On the other hand, in the present embodiment, the execution or prohibition of read-write of variables by the robot control device 3A is determined according to the read-write permission/prohibition request, which is an I/O signal.

Figure 6A:
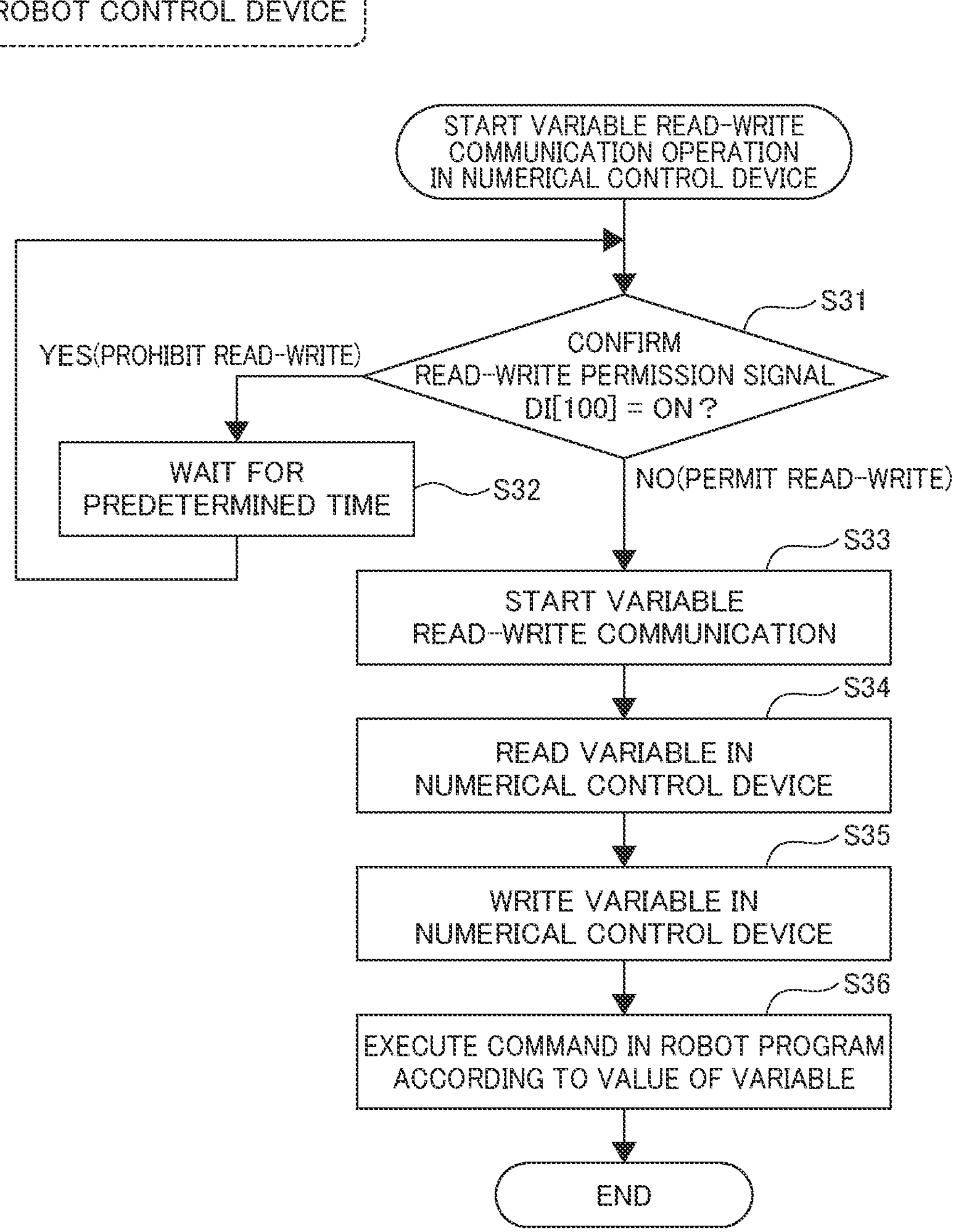
FIG. 6A is a flowchart showing a flow of processing relating to a robot control device according to the second embodiment.
Figure 6B:
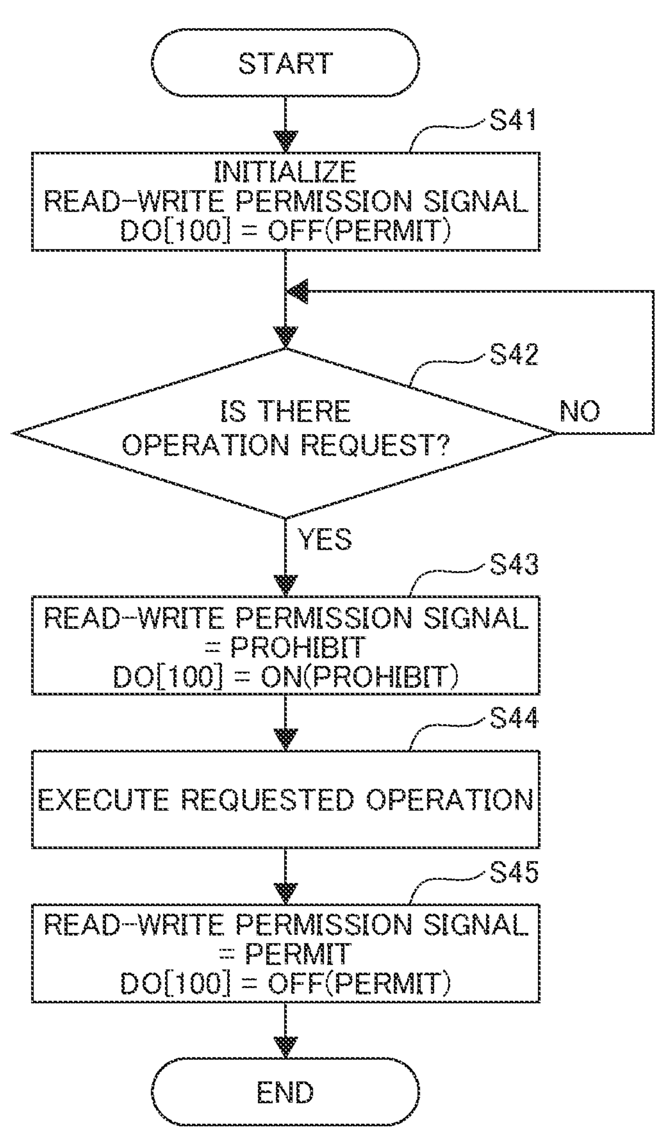
FIG. 6B is a flowchart showing the flow of processing relating to the numerical control device according to the second embodiment.

FIG. 6A is a flowchart showing the flow of processing of the robot control device 3A according to the second embodiment. FIG. 6B is a flowchart showing the flow of processing of the numerical control device 2A according to the second embodiment. These pieces of processing are repeatedly executed in accordance with the start of the operation of the robot 30, and are executed in parallel in conjunction with each other. Further, in the description of FIGS. 6A and 6B, the read-write permission/prohibition signal is described as a read-write permission signal for turning off (permission) and a read-write permission signal for turning on (prohibition).

First, as shown in Step S41 of FIG. 6B, the numerical control device 2A initializes a read-write permission signal. Specifically, for example, DO[100] is defined as an outputted read-write permission signal, and the read-write permission signal DO[100] is rewritten to OFF (permission). The read-write permission signal DO[100] rewritten to OFF (permission) is outputted from the read-write permission/prohibition signal output unit 29 to the read-write permission/prohibition signal input unit 39.

Next, as shown in Step S42 of FIG. 6B, the numerical control device 2A determines whether or not there is a variable read-write communication operation request in the numerical control device 2A. If the determination is YES, the processing advances to Step S43 to rewrite the read-write permission signal DO [100] to ON (prohibition), to output the signal from the read-write permission/prohibition signal output unit 29 to the read-write permission/prohibition signal input unit 39, and then advances to Step S44 to execute the variable read-write communication operation. After the execution, the processing advances to Step S45 to rewrite the read-write permission signal DO [100] to OFF (permission) and output the signal from the read-write permission/prohibition signal output unit 29 to the read-write permission/prohibition signal input unit 39, thereby ending the processing of the numerical control device 2A.

In addition, the variable read-write communication operation request is assigned to, for example, a predetermined variable, is requested from the robot control module 300 to the machine tool control module 200, is stored in the variable storage unit 24, and is acquired by the machine tool control module 200 reading the request. When the determination in Step S42 is NO, Step S42 is repeated.

On the other hand, as shown in Step S31 of FIG. 6A, the robot control device 3A determines whether or not the read-write permission signal DI[100] inputted to the read-write permission/prohibition signal input unit 39 is ON (prohibition). If this determination is YES, since the read-write is prohibited, the processing advances to Step S32 to wait for a predetermined period of time, and then the flow returns to Step S31. When the determination is NO, since the read-write is permitted, the processing advances to Step S33 to start the variable read-write communication.

Next, as shown in Step S34 of FIG. 6A, the robot control device 3A reads variables in the numerical control device 2A. Specifically, the robot control module 300 reads the variables in the numerical control device 2 stored in the variable storage unit 24.

Next, as shown in Step S35 of FIG. 6A, the variables in the numerical control device 2A are rewritten in the robot control device 3A. Specifically, the robot control module 300 rewrites the variables in the numerical control device 2 stored in the variable storage unit 24.

Next, as shown in Step S36 of FIG. 6A, the robot control device 3A executes a command in the robot program according to the value of the variable. Thus, the processing of the robot control device 3A is terminated.

According to the present embodiment, in addition to the same advantageous effects as in the first embodiment, the following advantageous effects are achieved.

The numerical control device 2A includes the read-write permission/prohibition signal output unit 29 that outputs a read-write prohibition signal, which is an I/O signal that prohibits read-write of the variables by the robot control device 3A during execution of the operation of the numerical control device 2A or during execution of the operation of the robot control device 3A, and outputs a read-write permission signal, which is an I/O signal that permits read-write of the variables by the robot control device 3A after completion of the operation of the numerical control device 2A or after completion of the operation of the robot control device 3A. The robot control device 3A includes the read-write permission/prohibition signal input unit 39 that receives a read-write permission/prohibition signal outputted from the read-write permission/prohibition signal output unit 29. Further, the read-write execution/prohibition determination unit 36A determines execution or prohibition of read-write of the variables by the robot control device 3A according to the read-write permission/prohibition request based on the read-write permission/prohibition signal. With such a configuration, it is possible to operate the read-write prohibition request not only from the numerical control program by the variables, but also from the outside of the numerical control program, such as an operation panel of the machine tool 20 or a ladder program, by using an I/O signal.

The present disclosure is not limited to the above embodiments, and various changes and modifications are possible.

For example, in the above embodiments, the variable storage unit 24 for storing the values of the plurality of variables that can be read and written from both the machine tool control module 200 and the robot control module 300 is provided in the numerical control device 2. However, the present invention is not limited thereto.

The variable storage unit may be provided, for example, in a robot control device communicably connected to the numerical control device. In this case, since the machine tool control module of the numerical control device can read and write the values of the variables stored in the variable storage unit provided in the robot control device via the communication, it is possible to achieve the same advantageous effect as in the above embodiment.

Further, the variable storage unit may be provided, for example, in a server communicably connected to each of the numerical control device and the robot control device. In this case, since the machine tool control module of the numerical control device and the robot control module of the robot control device can read and write the values of variables stored in the variable storage unit provided in the server via the communication, it is possible to achieve the same advantageous effect as in the above embodiment.

EXPLANATION OF REFERENCE NUMERALS

1,1A numerical control system
2,2A numerical control device
3,3A robot control device
20 machine tool
21 storage unit
22 program input unit
23 analysis unit
24 variable storage unit
25 data transmission/reception unit
26 I/O control unit
27 interpolation control unit
28 servo control unit
29 read-write permission/prohibition signal output unit
30 robot
30*a* arm tip portion
30*b* tool
31 storage unit
32 program input unit
33 analysis unit
35 data transmission/reception unit
36 and 36A read-write execution/prohibition determination unit
37 path control unit
38 servo control unit
39 read-write permission/prohibition signal input unit
200 machine tool control module
300 robot control module

The invention claimed is:

1. A numerical control system that controls operation of a machine tool and operation of a robot in conjunction with each other, the numerical control system comprising:

a numerical control processor that controls the operation of the machine tool based on a numerical control program;

a robot control processor that controls the operation of the robot based on a robot control program; and a variable memory that stores values of variables that are readable and writable by the numerical control processor and the robot control processor, wherein the robot control processor determines execution or prohibition of read-write of the variables according to a read-write permission/prohibition request for requesting permission or prohibition of the read-write of the variables by the numerical control processor, when the robot control processor determines that read-write of the variables is executed, the robot control processor reads a value of a variable stored in the variable memory to control the operation of the robot based on the value of the variable read, and when the robot control processor determines that read-write of the variables is prohibited, the robot control processor prohibits reading of a value of a variable stored in the variable memory, and the robot control processor acquires an operation completion time of the numerical control processor or an operation completion time of the robot control processor, and according to the read-write permission/prohibition request based on a lapse of these operation completion times, determines execution or prohibition of read-write of the variables by the robot control processor, and the robot control processor determines that the robot control processor executes read-write of the variables after a lapse of the operation completion time of the numerical control processor or the operation completion time of the robot control processor.

2. The numerical control system according to claim 1, wherein the robot control processor acquires the operation completion time of the numerical control processor or the operation completion time of the robot control processor via a variable in the numerical control program or the robot control program.

3. The numerical control system according to claim 1, wherein the numerical control processor outputs a read-write prohibition signal, which is an I/O signal that prohibits read-write of the variables by the robot control processor during execution of the operation of the numerical control processor or during execution of the operation of the robot control processor, and outputs a read-write permission signal, which is an I/O signal that permits read-write of the variables by the robot control processor after completion of the operation of the numerical control processor or after completion of the operation of the robot control processor, the robot control processor receives a read-write permission signal and the read-write prohibition signal outputted from the numerical control processor, and the robot control processor determines execution or prohibition of read-write of the variables by the robot control processor according to the read-write permission/prohibition request based on the read-write permission/prohibition signal.

4. The numerical control system according to claim 1, wherein the numerical control processor performs read-write of the values of the variables stored in the variable memory based on the numerical control program, and the robot control processor performs read-write of the values of the variables stored in the variable memory based on the robot control program.

5. The numerical control system according to claim 1, wherein the variables are designated by numbers or character strings in the numerical control program and the robot control program.

6. The numerical control system according to claim 5, wherein the variables are macro variables.

* * * * *